J. M. BEEBE.
Feeding Bees.
No. 63,135.
Patented March 26, 1867.
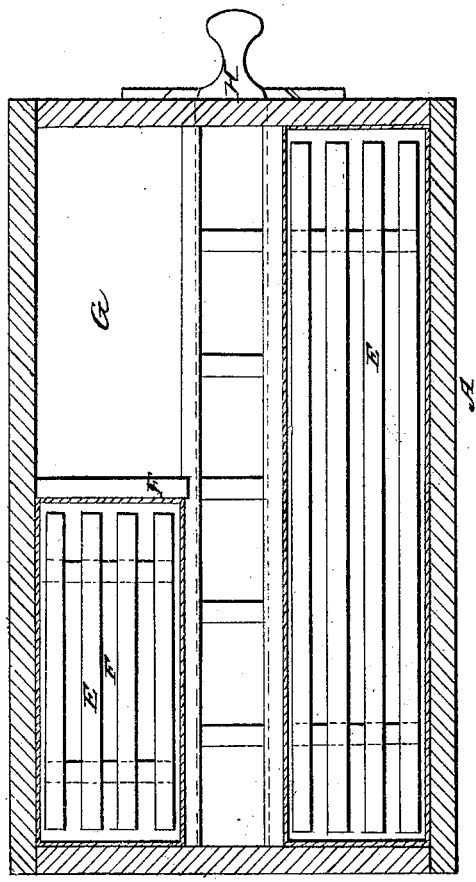
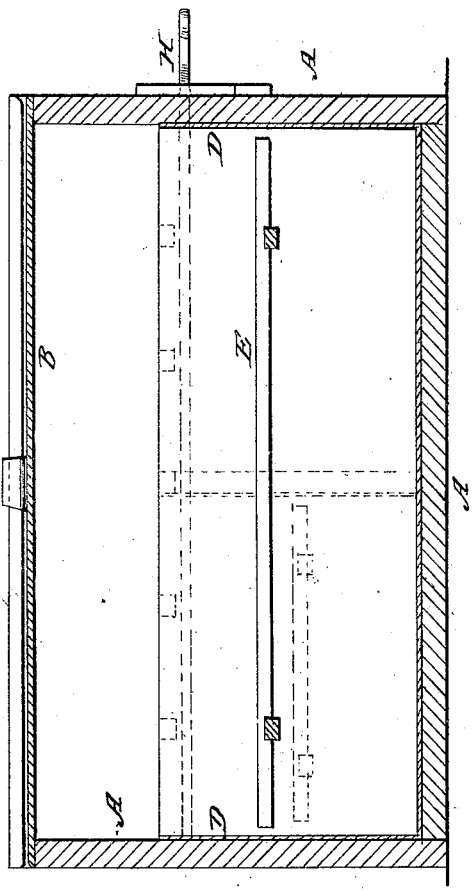
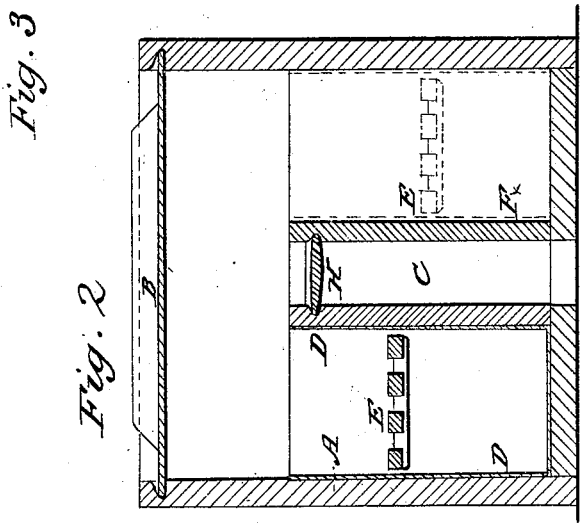
Witnesses:
John White
B. H. Muehle
Inventor:
James M. Beebe
By E. D. & W. A. Forbush Attys

United States Patent Office.

JAMES M. BEEBE, OF CASADAGA, NEW YORK.

Letters Patent No. 63,135, dated March 26, 1867.

IMPROVEMENT IN BEE FEEDERS.

*The Schedule referred to in these Letters Patent and making part of the same.*

TO ALL WHOM IT MAY CONCERN:

Be it known that I, JAMES M. BEEBE, of Casadaga, in the county of Chautauqua, and State of New York, have invented a new and improved Bee Feeder; and I do hereby declare that the following is a full and exact description thereof, reference being had to the accompanying drawings, making a part of this specification, in which—

Figure I is a sectional elevation.
Figure II is a transverse section.
Figure III is a plan view.
Reference letters of like name and kind refer to like parts of each of the figures.

The nature of this invention consists in making a bee feeder having a tank for water and for a solution of sugar or saccharine matter, with a rack or flat thereon, to sustain the bees while feeding, and which has a central passage way for the bees to enter, and which may be placed on the top of the hive, so that the temperature within the hive may be maintained in the feeder.

A represents a box made of wood, of suitable size to be placed on the top of a bee hive. It has a glass top or sliding glass door, B, for the admission of light and for access to the interior of the feeder, to furnish food and drink for the bees. It is divided into two or more apartments, with a central passage way, C, for the entrance of the bees. In one of these apartments is placed a tank, D, which may be made of tin or other metal. This is for the purpose of holding a solution of sugar or other saccharine matter in the form of liquid sirup for the bees to feed upon. A rack or float, E, is made and placed upon the liquid, which will float thereon and support the bees while they are feeding. Were it not for this rack the bees would be liable to be drowned in the liquid when they come in to feed; but this rack floating upon the liquid permits the bees to light and crawl thereon, and supports them, so that they can feed upon the liquid without any danger of falling or being drowned therein. The rack of course floats upon the liquid, and will settle down as the liquid is used up, so that the bees have equal opportunity to feed upon the liquid, whether there be little or much in the tank. This sugar solution furnishes a cheap food for the bees, much cheaper than honey, which they would otherwise use. It can be furnished at any and all proper times, and will enable the bees to rear young swarms and throw them off one month or six weeks earlier than they would if this food was not furnished. It also saves to the apiarian a large quantity of honey which the bees would otherwise consume for food. A swarm of bees can be wintered upon this food, without comb in the hive. F represents a water tank, having a rack or float, E. This will furnish the bees with drink without danger of being drowned in the water. The float or rack answers the same purpose in the water tank as it does in the tank containing the sugar liquid. G represents a box for unbolted rye flour. This rye flour is a substitute for bee bread and an equivalent therefor. H is a slide door placed in the central passage way for the purpose of shutting the bees out while the tanks or cups are removed and cleaned and filled and returned with fresh sugar sirup and water and rye flour. By this arrangement the bees will not be disturbed, and there will be no danger of the operator being stung or of the bees flying off while this work is being done. The light coming in through the glass door will attract the bees into the feeder. The animal heat will ascend from the hive up through the central passage way into the feeder, so that the temperature in the feeder will be nearly the same as in the hive. I have used this feeder with great success.

What I claim as my invention, and desire to secure by Letters Patent, is—

1. The construction of a bee feeder with an apartment for sugar liquid and an apartment for water, provided with racks or floats E, and an apartment for flour or other food, with a central passage way C and door H, all combined substantially as described.

2. A bee feeder having a central passage way, C, for the entrance of the bees, slide door H, and glass cover B, for the purpose and substantially as described.

JAMES M. BEEBE.

Witnesses:
N. KING,
SIDNEY WARREN.